United States Patent
Mierzejewski (10) Patent No.: US 12,419,283 B2
(45) Date of Patent: Sep. 23, 2025

(54) CLAM RAKE AND GAUGE ASSEMBLY

(71) Applicant: John Mierzejewski, West Hartford, CT (US)

(72) Inventor: John Mierzejewski, West Hartford, CT (US)

(*) Notice: Subject to any disclaimer, the term of this patent is extended or adjusted under 35 U.S.C. 154(b) by 841 days.

(21) Appl. No.: 17/525,041

(22) Filed: Nov. 12, 2021

(65) Prior Publication Data

US 2023/0148576 A1     May 18, 2023

(51) Int. Cl.
*A01K 80/00*     (2006.01)

(52) U.S. Cl.
CPC ..................... *A01K 80/00* (2013.01)

(58) Field of Classification Search
CPC ...... A01K 80/00; A01K 80/005; A01K 97/20; A01K 87/008; A01K 75/00; A01K 87/007; A01D 7/00; A01B 1/20; A01B 1/026; B25F 5/028
USPC .................................................. 56/9, 400.11
See application file for complete search history.

(56) References Cited

U.S. PATENT DOCUMENTS

| | | | | |
|---|---|---|---|---|
| 1,782,497 A * | 11/1930 | Anderson | ............... | A01K 80/00 37/316 |
| 3,221,485 A * | 12/1965 | Jenkins | .................. | A01B 80/00 37/285 |
| 4,190,279 A * | 2/1980 | Sguazzin | ............... | A01K 80/00 37/316 |
| 4,311,332 A * | 1/1982 | Walker | .................. | A01K 80/00 294/111 |
| 5,519,592 A * | 5/1996 | Helms | .................... | A01K 80/00 33/783 |
| 2020/0128793 A1* | 4/2020 | Fredrickson | ........... | A01B 1/026 |

OTHER PUBLICATIONS

Urban Island, "Clam digging at Pismo Beach", Oct. 30, 2009, <https://urbanislanddesign.blogspot.com/2009/10/clam-digging-at-pismo-beach.html> (Year: 2009).*
Oceano Dunes District, "Pismo Clam Adventure: Junior Ranger Program", Sep. 4, 2020, <https://www.youtube.com/watch?v=mz0X4YZWnE8> (Year: 2020).*
Danielson, "Danielson 200CRGA Crab Gauge Anodized Aluminum, Blue, One Size", Apr. 1, 2013, <https://www.amazon.com/Danielson-200CRGA-Gauge-Anodized-Aluminum/dp/B00C4ZRBUG?source=ps-sl-shoppingads-Ipcontext&ref_=fplfs&psc=1&smid=ATVPDKIKXODER> (Year: 2013).*
Tukima, "American Blue Claw Multi State Adjustable Crab, Clam & Lobster Culling Gauge", Sep. 30, 2016, <https://www.amazon.com/American-Blue-Claw-Adjustable-Lobster/dp/B01MON6MRS> (Year: 2016).*

* cited by examiner

*Primary Examiner* — Christopher J Sebesta
*Assistant Examiner* — Blake E Scoville
(74) *Attorney, Agent, or Firm* — Robinson & Cole LLP (57) ABSTRACT

A gauge for measuring the size of a clam includes a C-shaped body that has a base that extends from a first axial end to a second axial end, a first leg extending from the base proximate the first end and a second leg extending from the base proximate the second end. A gap extends between the first leg and the second leg. The gap having a predetermined magnitude selected to match minimum size limitations for keeping a clam. The gauge being removably securable to a shaft of a clam rake.

12 Claims, 10 Drawing Sheets

CLAM RAKE AND GAUGE ASSEMBLY

FIELD OF THE TECHNOLOGY

The present invention is directed to a gauge for measuring clams and more particularly to a gauge that is removably securable to a clam rake. The present invention includes rake and gauge assembly for harvesting clams, and more particularly for conveniently and quickly measuring the size of clams harvested via the rake to ensure the clams exceed the minimum legal limit to keeping them.

BACKGROUND

Harvesting clams (i.e., marine bivalve mollusks) involves starting by looking in bays and estuaries that get plenty of tidal flow. Quahogs (i.e., *Mercenaria mercenaria*) are commonly referred to as hard shelled clams. Clams live in a variety of conditions, including sand, mud, and even rocky areas. Clams can be harvested using a rake to probe a muddy/sandy bottom to locate and capture the clams.

In addition, when harvesting clams, local codes require that a clam be greater than a certain size, typically one inch, to be able to keep them. The size of a clam is referred to as hinge width which is the thickness of a quahog as measured between the convex apex of the right shell and the convex apex of the left shell. Measuring the clam's hinge width requires the use of a gauge. Typically, the gauge is handheld by the person harvesting the clams and the measurement involves reaching into the rake, picking the clam out of the rake and measuring the clam in the handheld gauge. The measuring process is tedious because of the back and forth between the rake and the handheld gauge.

Based on the foregoing, there is a need to an improved device for harvesting and measuring clams.

SUMMARY

There is disclosed herein a rake and gauge assembly for harvesting clams. The assembly includes a basket that has hoop shaped perimeter structure. A permeable cage is secured to the basket. The cage has an opening located at the perimeter structure. The basket has a rake secured to and extending from the perimeter structure. A shaft is secured to and extends from the perimeter structure. A gauge is secured to the shaft or the perimeter structure. The gauge is configured to measure a clam shell size.

In some embodiments, the gauge is in the form of a C-shaped body that has a base which extends from a first axial end to a second axial end thereof. A first leg extends from the base proximate the first end and a second leg extends from the base proximate the second end. A gap extends between the first leg and the second leg. The gap has a predetermined magnitude selected to match minimum size limitations for keeping a clam.

In some embodiments, a clamp extends around the shaft and is secured to the gauge.

In some embodiments, the gauge is adjustable. For example, a shim is secured to one of the first leg and the second leg and the shim is configured to decrease the magnitude of the gap.

In some embodiments, the gauge made from a plastic material or a metallic material or combinations thereof.

In some embodiments, the gauge includes a scale on the base between the first leg and the second leg. The scale has indicia of length marked thereon.

In some embodiments, the gap and the opening of the cage are in substantially a common direction.

In some embodiments, the gauge is in close proximity to the opening of the cage.

In some embodiments, the base of the gauge includes a groove formed therein. The groove has a shape complementary to that of the shaft.

In some embodiments, the clamp includes a recess that has a shape complementary to that of the shaft.

The present invention includes a gauge for measuring the size of a clam. The gauge includes a C-shaped body that has a base that extends from a first axial end to a second axial end, a first leg that extends from the base proximate the first end and a second leg that extends from the base proximate the second end. A gap extends between the first leg and the second leg. The gap has a predetermined magnitude selected to match minimum size limitations for keeping a clam.

In some embodiments, the gauge includes a clamp that is removable secured to the gauge.

In some embodiments, the base has a groove formed therein. The groove has a shape configured for receiving a shaft therein.

In some embodiments, the clamp has a recess therein which has a shape configured to receive a shaft therein.

In some embodiments, the gauge is adjustable. For example, a shim secured to one of the first leg and the second leg. The shim configured to decrease the magnitude of the gap.

In some embodiments, the gauge is made from a plastic material, PVC, a metallic material or combinations thereof.

In some embodiments, the gauge has a scale on the base between the first leg and the second leg, the scale having indicia of length.

In some embodiments, the clamp, recess and groove are sized to receive a range of shaft sizes.

DETAILED DESCRIPTION

As shown in FIGS. 1-4 a rake and gauge assembly for harvesting clams is generally designated by the numeral 10. The rake and gauge assembly 10 includes a basket 12 having hoop shaped perimeter structure 14 (e.g., rectangular frame). A permeable cage 16 (e.g., a receptacle of interwoven metallic wires) is secured to the basket 12. The cage 16 has an opening 16E at the perimeter structure 14. The basket 12 has a rake 18 secured to and extending from the perimeter structure 14. The rake 18 includes a plurality of prongs 18P spaced apart from one another.

Figure 5:
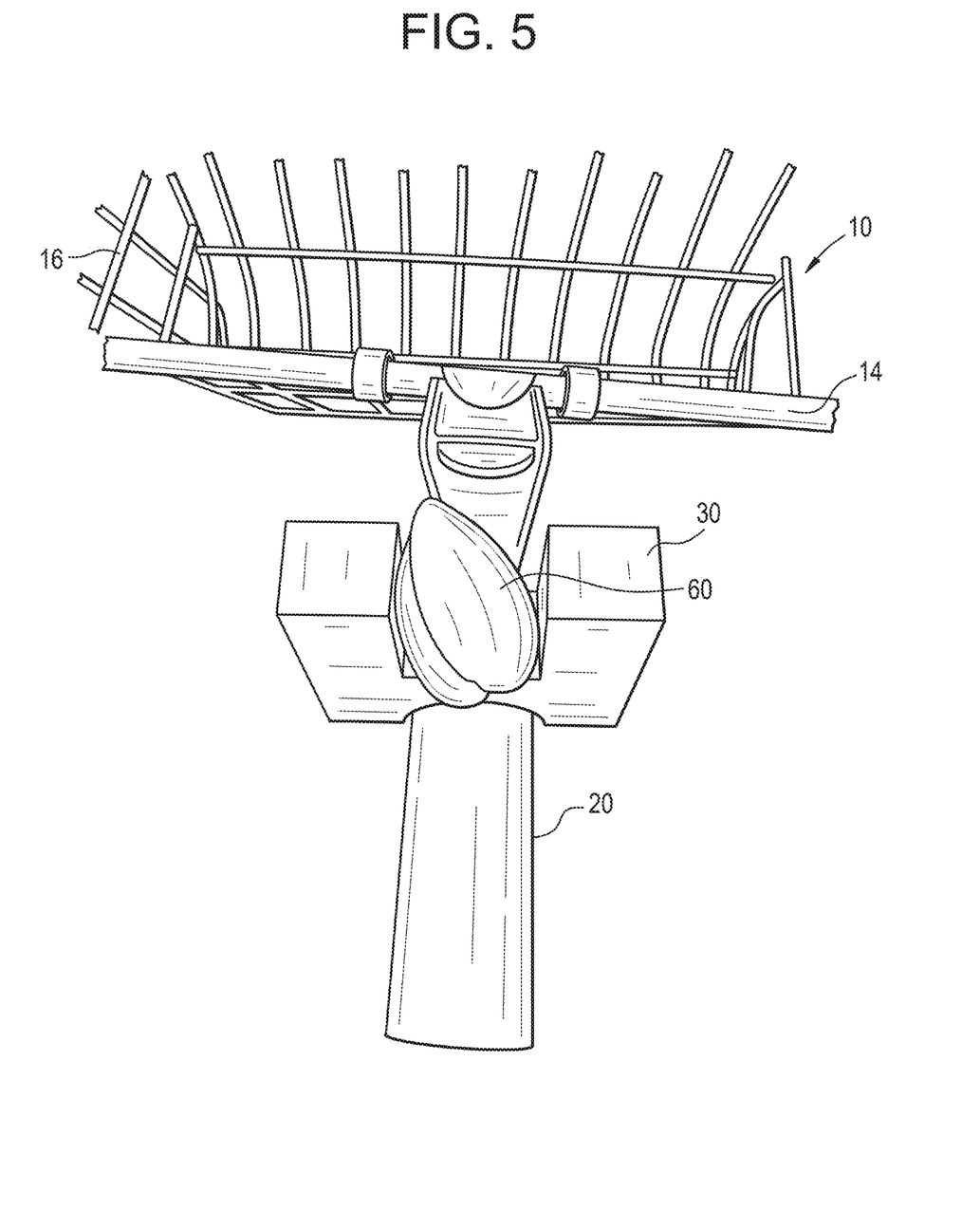
FIG. 5 is photograph of a top view of the rake and gauge assembly of the present invention shown with a clam being measured in the gauge.

A shaft 20 is secured to and extends from the perimeter structure 14. A gauge 30 (e.g. a go/no-go gauge) is secured to the shaft 20. The gauge 30 is configured to measure the hinge width of a clam shell 60 as shown in FIG. 5. If the clam 60 fits through the gap G, then the clam 60 is too small and must be returned to the sea. While the gauge 30 is shown and described as being secured to the shaft 20, the present invention is not limited in this regard as the gauge 30 may be secured to the perimeter structure 14.

Figure 3:
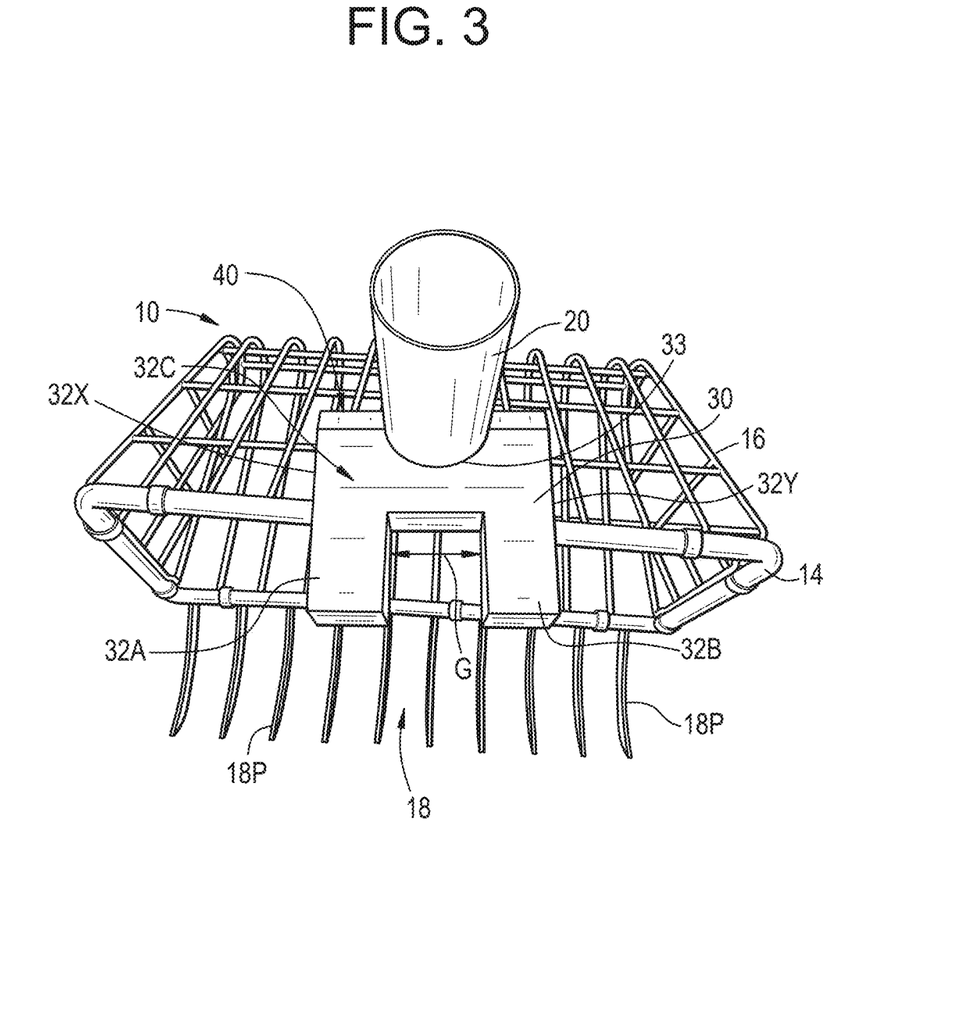
FIG. 3 is photograph of an end view of the rake and gauge assembly of the present invention.
Figure 9:
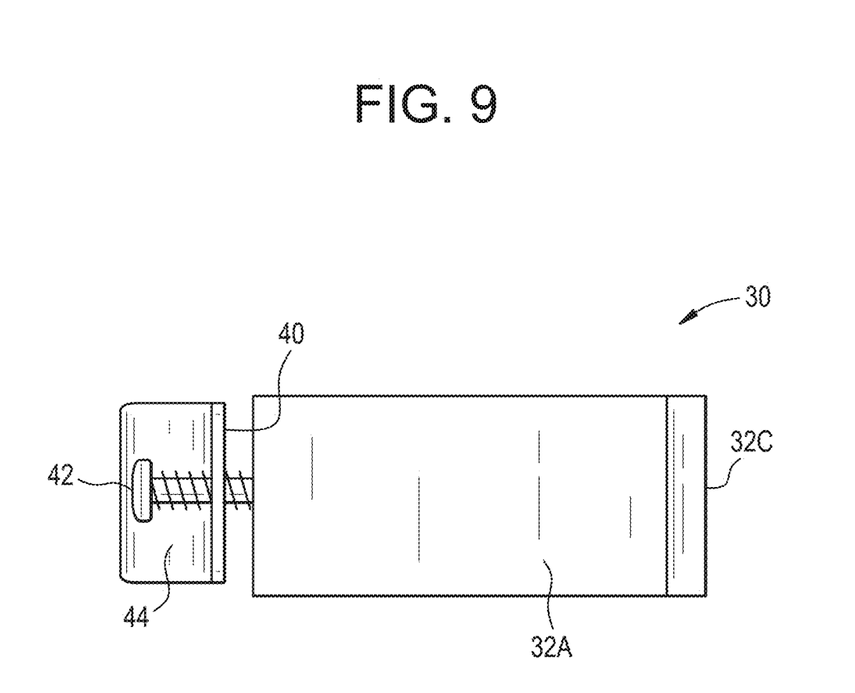
FIG. 9 is a side view of the gauge of the present invention.
Figure 10:
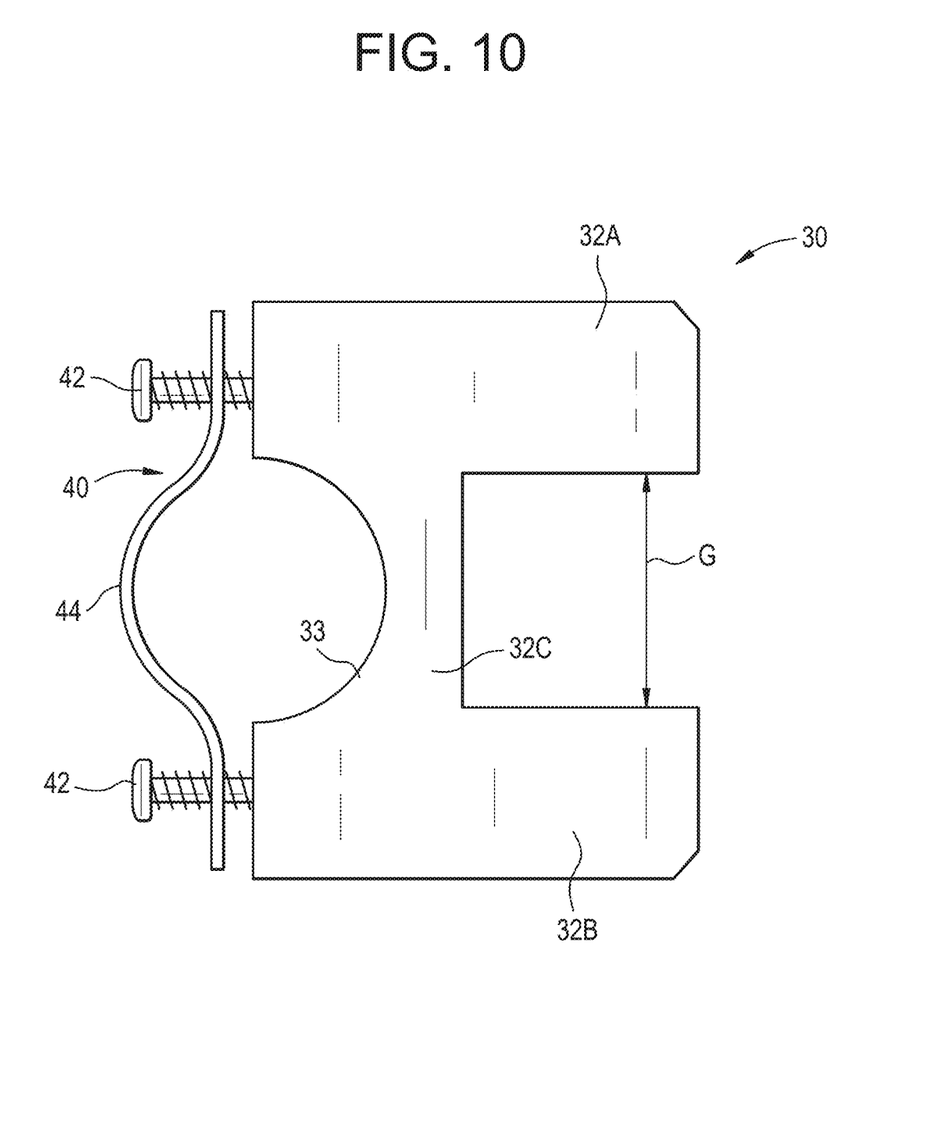
FIG. 10 is a front view photograph of the gauge of the present invention.

As best shown in FIGS. 3, 9 and 10, the gauge 30 has a C-shaped body having a base 32C that extends from a first axial end 32X to a second axial end 32Y. A first leg 32A extends from the base 32C proximate the first end 32X and a second leg 32B extends from the base 32C proximate the second end 32y. A gap G extends between the first leg 32A and the second leg 32B. The gap G has a predetermined magnitude selected to match minimum size limitations for keeping a clam. For example, in one embodiment the gap G has a magnitude of one inch.

Figure 4:
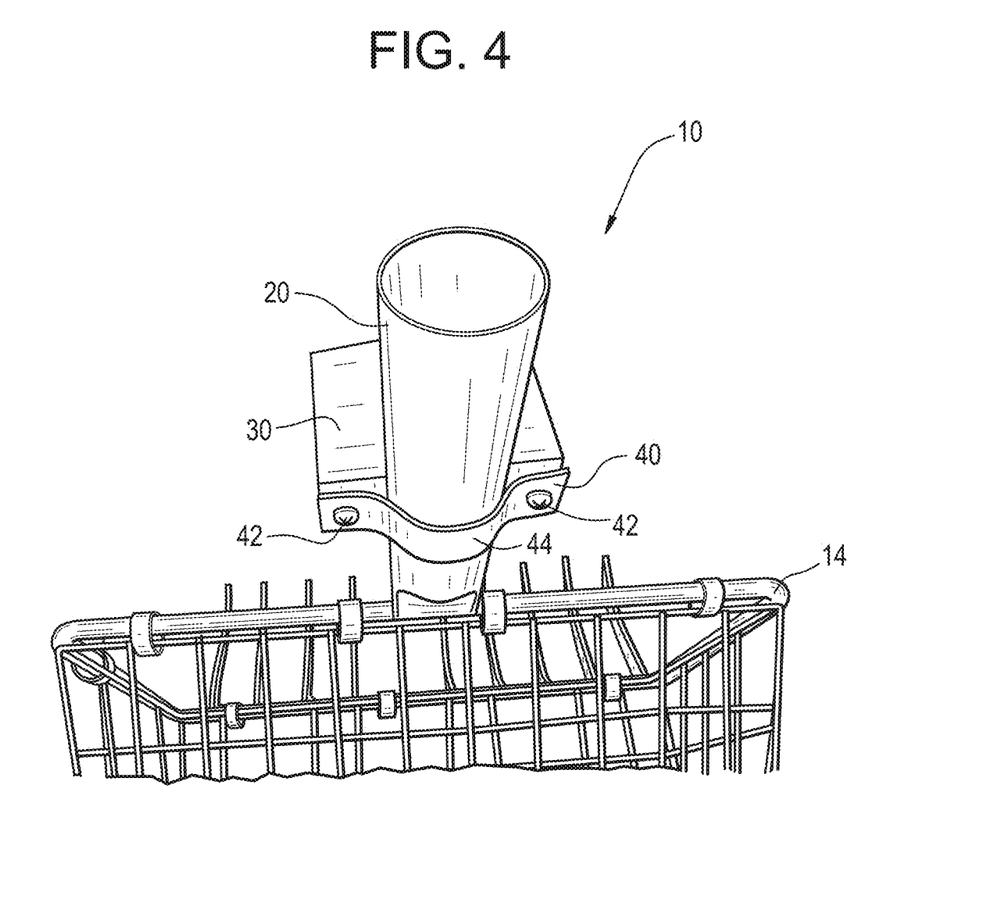
FIG. 4 is photograph of an end view of the rake and gauge assembly of the present invention.

As shown in FIG. 4, the rake and gauge assembly 10 includes a clamp 40 that extends around the shaft 20 and is secured to the gauge 30. The clamp has a recess 44 formed therein that has a shape complementary to that of the shaft 20. As shown in FIG. 3, the base 32C of the gauge 30 has a groove 33 formed therein. The groove 33 has a shape complementary to that of the shaft 20. The clamp 40 is secured to the base 32C of the gauge 30 with suitable fasteners 42 such as screws such that the clamp 40 and the base 32C of the gauge 30 removably wrap around the shaft 20.

Figure 6:
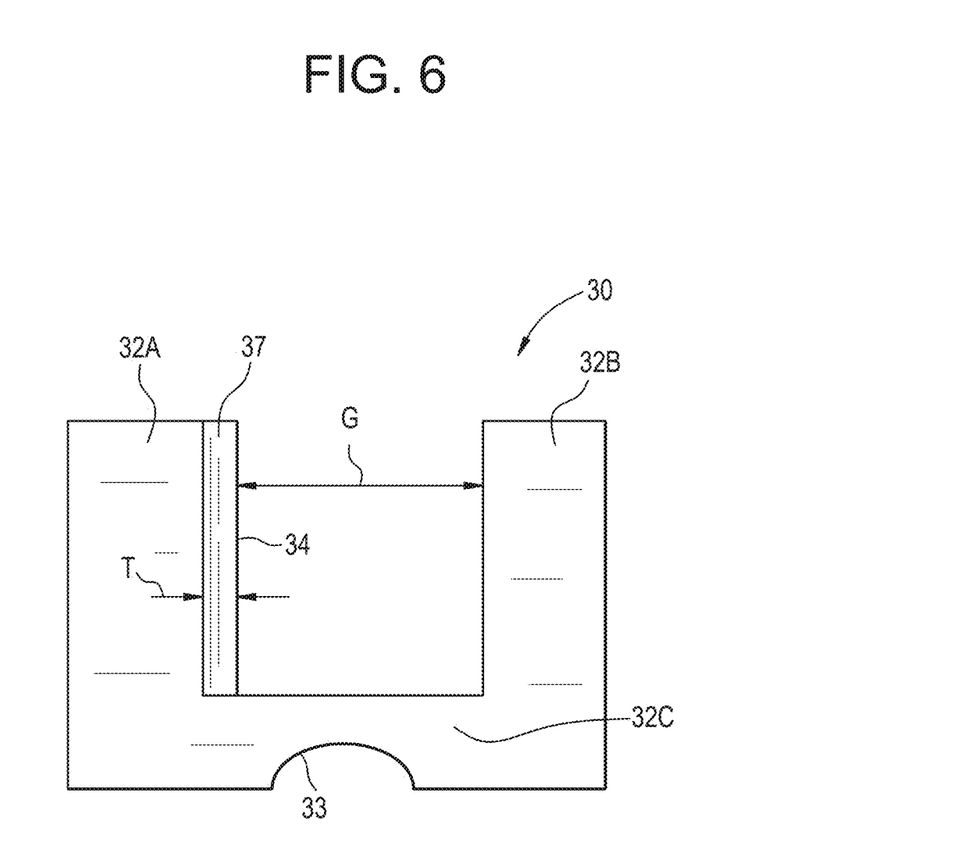
FIG. 6 is a side cross sectional view of another embodiment of the gauge of the present invention.

As shown in the embodiment of FIG. 6, the gauge 30 is adjustable. In some embodiments, the gauge 30 includes shim 37 that is removably secured to the first leg 32A. The shim 27 has a thickness T that is configured to decrease the magnitude of the gap G to comport with local size limits for keeping clams. While the shim 37 is shown and described as being secured to the first leg 32A, the present invention is not limited in this regard as other configurations may be employed including but not limited to the shim 37 being removably secured to the second leg 32B alone or in addition to the shim 37 being secured to the first leg 32A.

The gauge 30 is made from a corrosion resistant material that withstands immersion in saltwater brine, such as plastic, PVC and/or metallic material. In some embodiments, the gauge has a predetermined color.

Figure 7:
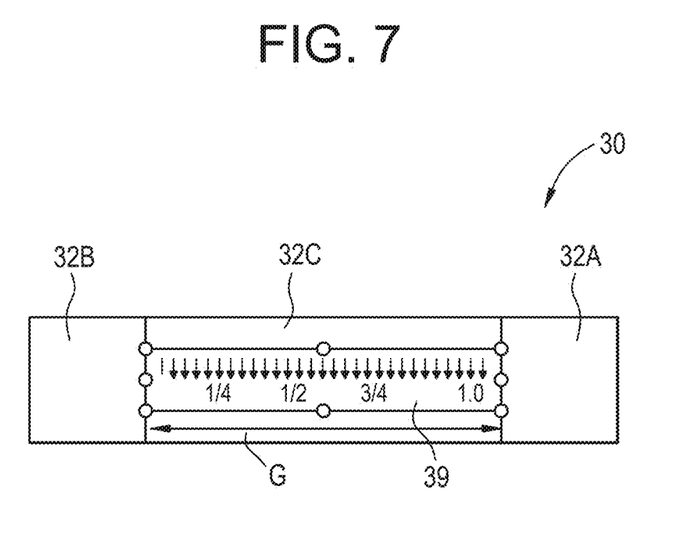
FIG. 7 is a top view of another embodiment of the gauge of the present invention.

As shown in the embodiment in FIG. 7, the gauge 30 includes a scale 39 on the base 32C between the first leg 32A and the second leg 32B. The scale 39 has indicia of length (e.g., fractions of an inch) thereon.

Figure 1:
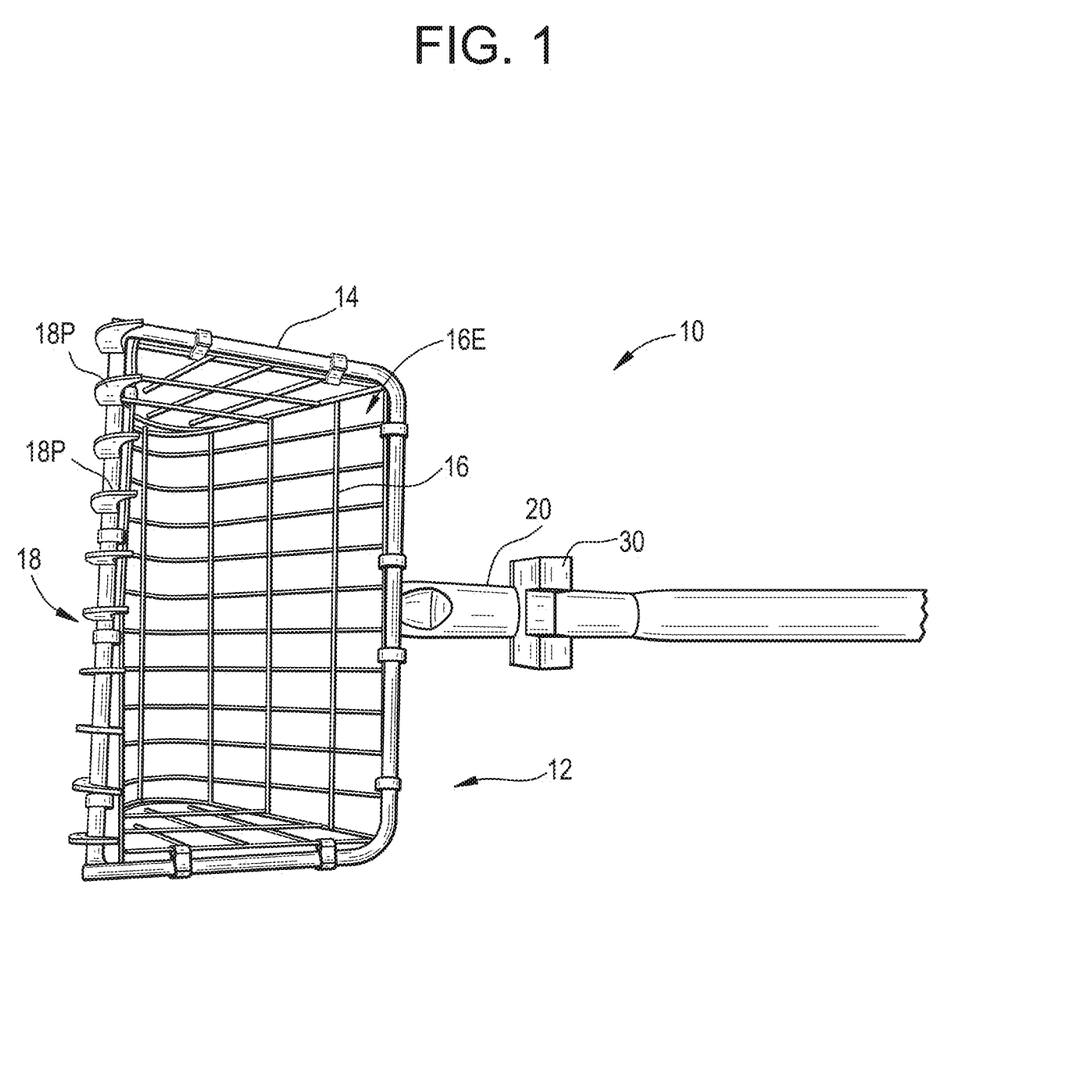
FIG. 1 is photograph of a top view of the rake and gauge assembly of the present invention.
Figure 2:
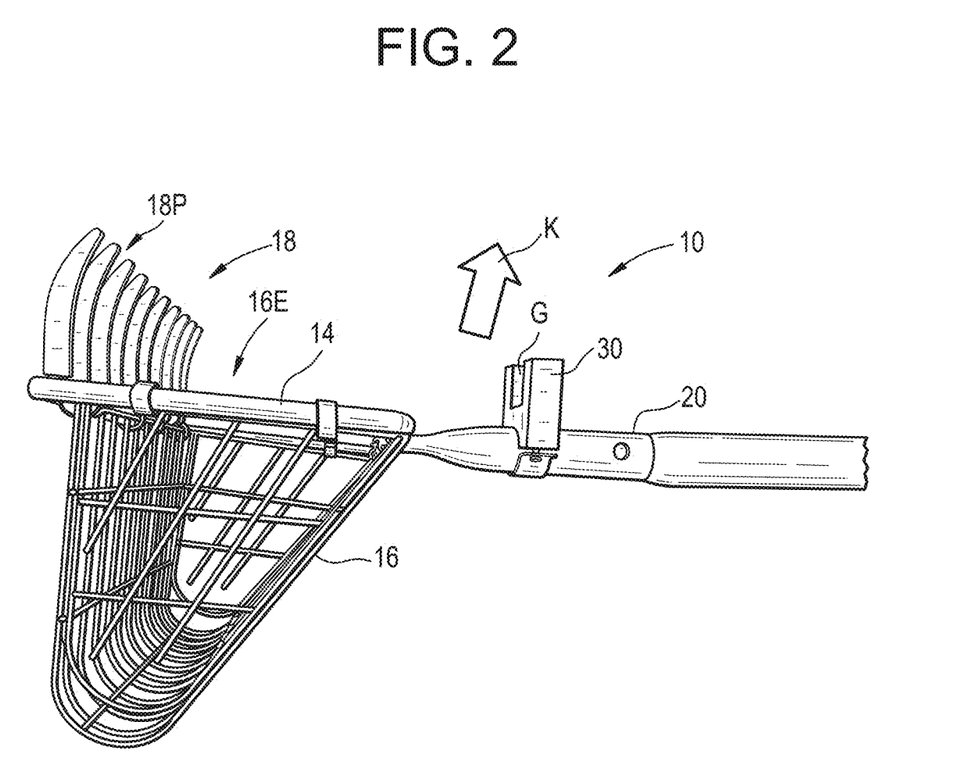
FIG. 2 is photograph of a side view of the rake and gauge assembly of the present invention.

As shown in FIG. 2, the gap G and the opening 16E of the cage 16 are in substantially a common direction as indicated by the arrow K to facilitate quick measuring of clams 90 taken out of the cage 16 in a location proximate (e.g., within one foot of the opening 16E) opening 16E of the cage 16.

Figure 8:
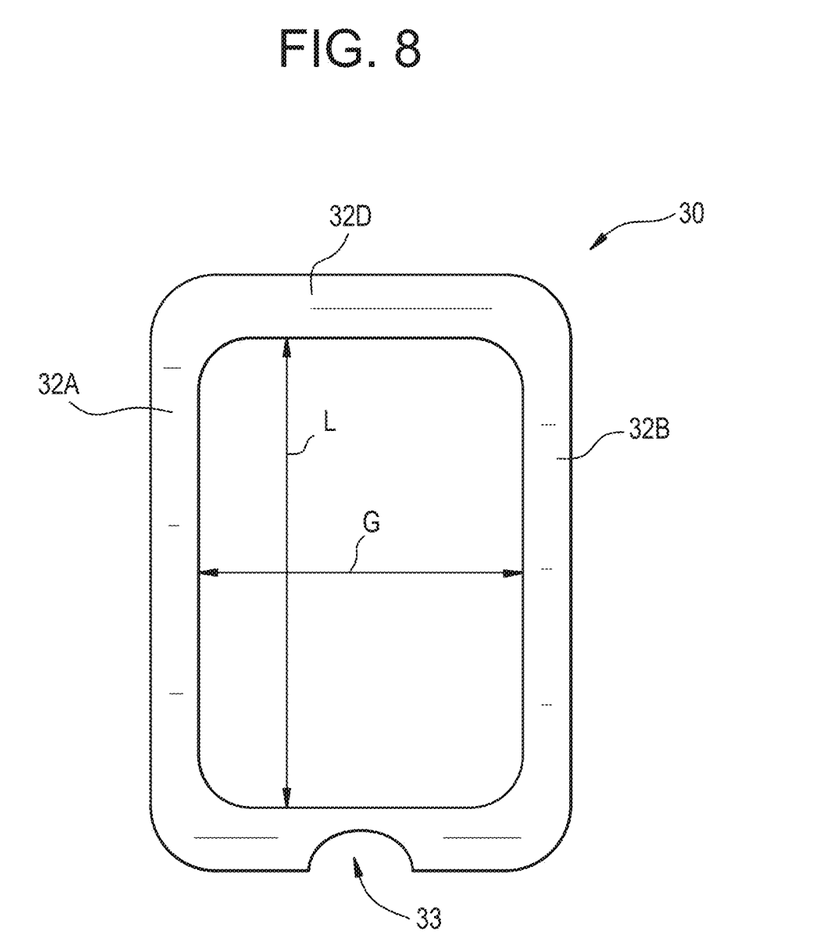
FIG. 8 is a front view of another embodiment of the gauge of the present invention.

As shown in FIG. 8 the gauge 30 is similar to the gauge 30 shown in FIG. 4 with the exception that the addition of a top section 32D which forms a closed loop type gauge. The distance between the top section 32D and the base 32D defines a length L for measuring a length of a mussel, for example.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A rake and gauge assembly for harvesting clams, the assembly comprising:
   a basket having hoop shaped perimeter structure, a permeable cage secured to the basket, the perimeter structure defining an opening in the cage, the basket having a rake secured to and extending from the perimeter structure at an outermost portion of the basket;
   a shaft secured to and extending from the perimeter structure, the shaft having a shaft longitudinal axis;
   a gauge secured to the shaft, the gauge being configured to measure a clam shell;
   the gauge comprising:
   a C-shaped body having a base extending from a first axial end to a second axial end, a first leg extending from the base proximate the first axial end and a second leg extending from the base proximate the second axial end, a gap extending between the first leg and the second leg, the gap having a predetermined magnitude selected to match minimum size limitations for keeping a clam, wherein the gap and the opening of the cage are in substantially a common direction;
   the base comprises a groove formed therein, the groove having a shape configured for receiving the shaft therein;
   a clamp removably secured to the gauge, the clamp having a recess formed therein and having a shape configured to receive the shaft therein;
   wherein the clamp and the groove are configured to surround the shaft and to removably secure the gauge to the shaft with the base being perpendicular to the shaft longitudinal axis.

2. The assembly of claim 1, wherein the gauge is adjustable.

3. The assembly of claim 2, further comprising a shim secured to one of the first leg and the second leg, the shim configured to decrease the magnitude of the gap.

4. The assembly of claim 1, wherein the gauge comprises at least one of plastic material and a metallic material.

5. The assembly of claim 1, wherein the gauge comprises a scale on the base between the first leg and the second leg, the scale having indicia of length.

6. The assembly of claim 1, wherein the gauge is within one foot of the opening of the cage.

7. A gauge for measuring the size of a clam, the gauge comprising:
   a C-shaped body having a base extending from a first axial end to a second axial end, a first leg extending from the base proximate the first axial end and a second leg extending from the base proximate the second axial end, a gap extending between the first leg and the second leg, the gap having a predetermined magnitude selected to match minimum size limitations for keeping a clam;
   the base comprises a groove formed therein, the groove having a shape configured for receiving a shaft therein;

a clamp removably secured to the gauge, the clamp having a recess formed therein and having a shape configured to receive the shaft therein;

wherein the clamp and the groove are configured to surround the shaft and to removably secure the gauge to the shaft with the base being perpendicular to a longitudinal axis of the shaft.

8. The gauge of claim 7, wherein the gauge is adjustable.

9. The gauge of claim 7, further comprising a shim secured to one of the first leg and the second leg, the shim configured to decrease the magnitude of the gap.

10. The gauge of claim 7, wherein the gauge comprises at least one of plastic material and a metallic material.

11. The gauge of claim 7, wherein the gauge comprises a scale on the base between the first leg and the second leg, the scale having indicia of length.

12. A rake and gauge assembly for harvesting clams and mussels, the assembly comprising:

a basket having hoop shaped perimeter structure, a permeable cage secured to the basket, the perimeter structure defining an opening in the cage, the basket having a rake secured to and extending from the perimeter structure, at an outermost portion of the basket;

a shaft secured to and extending from the perimeter structure, the shaft having a shaft longitudinal axis;

a gauge secured to the shaft, the gauge being configured to measure a clam shell and a mussel shell;

the gauge comprising:

a closed loop body having a base extending from a first axial end to a second axial end, a first leg extending from the base proximate the first axial end and a second leg extending from the base proximate the second axial end, a gap extending between the first leg and the second leg, the gap having a predetermined magnitude selected to match minimum size limitations for keeping a clam, a top section forming the closed loop body, the top section being located a distance from the base, the distance being configured to measure a length of a mussel;

the base comprises a groove formed therein, the groove having a shape configured for receiving the shaft therein;

a clamp removably secured to the gauge, the clamp having a recess formed therein and having a shape configured to receive the shaft therein;

wherein the clamp and the groove are configured to surround the shaft and to removably secure the gauge to perpendicular to the shaft with the base being perpendicular to the shaft longitudinal axis.

* * * * *